US011380008B2

(12) United States Patent
Marsh et al.

(10) Patent No.: US 11,380,008 B2
(45) Date of Patent: Jul. 5, 2022

(54) GAZE TRACKING SYSTEM WITH CONTACT LENS FIDUCIAL

(71) Applicant: Innovega Inc., Bellevue, WA (US)

(72) Inventors: Jay Marsh, Bellevue, WA (US); Mark Freeman, Bellevue, WA (US); Jerome Legerton, Bellevue, WA (US)

(73) Assignee: Innovega Inc., Bellevue, WA (US)

( * ) Notice: Subject to any disclaimer, the term of this patent is extended or adjusted under 35 U.S.C. 154(b) by 753 days.

(21) Appl. No.: 15/588,028

(22) Filed: May 5, 2017

(65) Prior Publication Data

US 2017/0337706 A1 Nov. 23, 2017

Related U.S. Application Data

(60) Provisional application No. 62/332,911, filed on May 6, 2016.

(51) Int. Cl.
| | |
|---|---|
| *G02B 27/32* | (2006.01) |
| *G06T 7/73* | (2017.01) |
| *H04N 5/225* | (2006.01) |
| *G06F 3/01* | (2006.01) |
| *H04N 17/00* | (2006.01) |

(Continued)

(52) U.S. Cl.
CPC ............ *G06T 7/73* (2017.01); *G02B 27/0093* (2013.01); *G02B 27/32* (2013.01); *G06F 3/013* (2013.01); *G06V 10/143* (2022.01); *G06V 10/147* (2022.01); *G06V 40/19* (2022.01); *G06V 40/193* (2022.01); *H04N 5/2253* (2013.01); *H04N 5/2256* (2013.01); *H04N 5/33* (2013.01); *H04N 17/002* (2013.01); *G02C 7/04* (2013.01); *G06T 2207/30201* (2013.01); *G06T 2207/30204* (2013.01)

(58) Field of Classification Search
CPC ...... H04N 5/33; H04N 17/002; H04N 5/2253; H04N 5/2256; H04N 5/225; G02B 27/0093; G02B 27/32; G06T 7/73; G06T 2207/30204; G06T 2207/30201; G06F 3/013; G02C 7/04
See application file for complete search history.

(56) References Cited

U.S. PATENT DOCUMENTS

| | | | | |
|---|---|---|---|---|
| 2004/0156554 A1* | 8/2004 | McIntyre | .................. | G06T 5/00 382/254 |
| 2007/0177103 A1* | 8/2007 | Migliaccio | ............. | A61B 3/145 351/206 |

(Continued)

*Primary Examiner* — Dave Czekaj
*Assistant Examiner* — Berteau Joisil
(74) *Attorney, Agent, or Firm* — Viksnins Harris Padys Malen LLP

(57) ABSTRACT

A gaze tracking system includes a contact lens, a photodetector element, a light conditioning element and electronics. The contact lens includes a fiducial having a position. The photodetector element receives a light signal from the fiducial and provides a photodetector output signal. The light signal provides a light intensity pattern at the photodetector. The optical conditioning element receives the light signal and provides a variation in the light intensity pattern on the photodetector in response to changes in the position of the fiducial. And the electronics process the photodetector output signal to calculate the position of the fiducial. A method includes detecting a light signal from a fiducial included in a contact lens, and tracking the contact lens by analyzing the light signal.

26 Claims, 13 Drawing Sheets

(51) Int. Cl.
  *H04N 5/33* (2006.01)
  *G02B 27/00* (2006.01)
  *G06V 10/143* (2022.01)
  *G06V 10/147* (2022.01)
  *G06V 40/19* (2022.01)
  *G06V 40/18* (2022.01)
  G02C 7/04 (2006.01)

(56) References Cited

U.S. PATENT DOCUMENTS

| | | | |
|---|---|---|---|
| 2009/0161827 A1* | 6/2009 | Gertner | A61N 5/1017 378/65 |
| 2011/0025979 A1* | 2/2011 | Chehab | G02C 7/04 351/212 |
| 2011/0202046 A1* | 8/2011 | Angeley | A61B 3/107 606/6 |
| 2014/0138544 A1* | 5/2014 | Sprague | G06F 3/013 250/341.8 |
| 2015/0199006 A1* | 7/2015 | He | G06F 3/013 345/158 |
| 2016/0106870 A1* | 4/2016 | Han | A61K 49/0404 424/9.411 |

\* cited by examiner

GAZE TRACKING SYSTEM WITH CONTACT LENS FIDUCIAL

CROSS-REFERENCE TO RELATED APPLICATIONS

This application claims priority to U.S. Provisional Application No. 62/332,911 that was filed on May 6, 2016. The entire content of the application referenced above is hereby incorporated by reference herein.

FIELD

The present disclosure is directed to an apparatus that provides a gaze tracking transceiver with a contact lens fiducial.

BACKGROUND

Eye tracking is used for monitoring the position of the eye gaze direction. This information can be used to assist augmented reality content displayed on digital eyewear (head mounted displays) and can be used as a user input device for digital eyewear, and can provide gaze data for marketing research and training purposes. Eye tracking can also be used to provide the pupil location to a display system so that the light from the display can be steered directly into the user's eye(s) thereby increasing display efficiency by not wasting light in directions where it won't enter the eye. Similarly, computational efficiency can be improved by not rendering visual information that is not in the user's line of sight.

Current systems that provide eye tracking include camera based pupil tracking (with and without IR illumination), and relative timing based trackers that work with scanning projectors. Other techniques which use camera imaging of the pupil and iris must have a refractive or reflective lens in the optical path such that a virtual image of the pupil and iris can be formed on the camera plane. This captured image is then processed for pattern recognition and relative motion of the pattern to determine the eye gaze direction. Thus, these systems require costly optics to image the eye and in addition to information processing systems. For these and other reasons there is a need for the subject matter of the present disclosure.

SUMMARY

A gaze tracking system includes a contact lens, a photodetector element, a light conditioning element and electronics. The contact lens includes a fiducial having a position. The photodetector element receives a light signal from the fiducial and provides a photodetector output signal. The light signal provides a light intensity pattern at the photodetector. The optical conditioning element receives the light signal and provides a variation in the light intensity pattern on the photodetector in response to changes in the position of the fiducial. And the electronics process the photodetector output signal to calculate the position of the fiducial.

A method includes detecting a light signal from a fiducial included in a contact lens, and tracking the contact lens by analyzing the light signal.

DESCRIPTION

Figure 1:
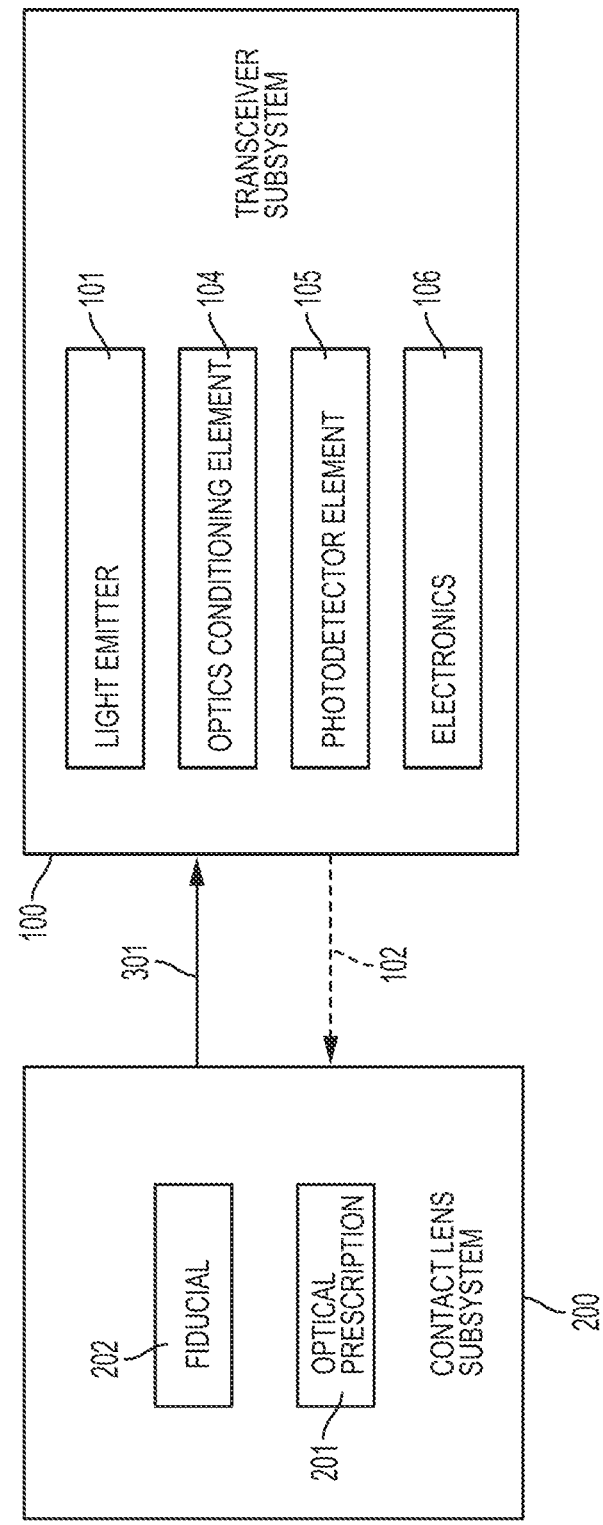
FIG. 1 shows an illustration of a block diagram of a gaze tracking system in accordance with some embodiments of the present disclosure.

FIG. 1 shows an illustration of a block diagram of a gaze tracking system in accordance with some embodiments of the present disclosure. The system includes a transceiver subsystem 100 and a contact lens subsystem 200. The transceiver subsystem 100 includes an optional light emitter 101, a received light optical conditioning element 104, a photodetector element or array 105, and electronics 106.

The light emitter 101 typically emits light that is invisible to the human eye, such as infrared or ultraviolet light, although any wavelength of light, including visible light, is allowed and consistent with the system operation. Light in the near infrared spectrum has the advantage of being invisible as well as inexpensive, since near infrared emitters are widely used in many applications including CD players and remote controls for home entertainment systems. The near infrared spectrum is also easily detected by silicon photodetectors, and is the least expensive and most ubiquitous type of photodetector. Typically, the light emitter would be a semiconductor light emitter, such as LEDs, VCSELs (vertical cavity surface-emitting lasers), or laser diodes, but any type of light emitter including incandescent, electroluminescent, neon, or OLED, are also viable. In some embodiments, the light emitter 101 is not included in the transceiver subsystem 100, but is instead incorporated into one or more fiducials on or in the contact lens.

In some embodiments, the emitter 101 is positioned on the frame of spectacle eyewear. In an alternate embodiment, the emitter 101 is positioned on or within the spectacle lens of eyewear. The spectacle eyewear may also contain a digital display intended to be viewed by the wearer. In another embodiment, the emitter 101 is contained on the digital display or is at least one pixel of the digital display.

In some embodiments, a near-IR emitter is used as the source 101. A well-defined cone of NIR light is transmitted toward the eye from the emitter 101 to cover the eye (contact lens, cornea, pupil, iris, and sclera) with low intensity NIR illumination. In this embodiment, the user wears a contact lens that has a "retro-reflector" fiducial located such that it is in a position that will be within the cone of emitted NIR light from the transmitter at all monitored eye-gaze positions and has its reflective surface facing the emitter 101. The retro-reflector reflects light toward the emitter 101 that is mostly collimated and about the diameter of the retro-reflector fiducial. The reflected beam diameter is larger than the emitter size and uniformly spaced around the emitter 101.

The received light optical conditioning element 104 can take many forms. Its function is to operate on the light received 301 from the fiducial on or within the contact lens in such a way that the light incident on the photodetector element or array 105 produces a pattern from which the position of the fiducial can be easily determined. In one embodiment, optical conditioning element 104 is the emitter 101 itself mounted directly above the photodetector element 105 in such a way that the received light 301 is blocked by the emitter while received light 301 in the area surrounding the emitter is passed. In this way, the emitter 101 effectively serves as a shadow mask for received light 301. The position of the shadow on the photodetector moves in direct correspondence to the motion of a fiducial 202 in the contact lens subsystem 200. In another embodiment, optical conditioning element 104 is a lens that focuses the received light 301 onto photodetector element 105 and the position of the focused light spot on the detector moves in direct correspondence to the motion of the fiducial 202 on or within the contact lens. In another embodiment, optical conditioning element 104 is a custom designed shadow mask with an arrangement of light blocking and light passing regions through which the received light passes on its way to the photodetector 105. This element may have a single light blocking region surrounded by a transparent region to cast a single shadow on the photodetector, or it may have multiple light blocking and light passing regions such that the pattern on the photodetector 105 contains more than one light or dark areas. In another embodiment, the optical conditioning element 104 includes a spectral bandpass filter to pass the wavelength of light that comes from the fiducial while blocking light outside of this spectral band to reduce ambient interference. In another embodiment, optical conditioning element 104 may be a diffractive, holographic, or refractive element such that the received light 301 passing through the optical conditioning element 104 produces a pattern on the photodetector 105 that makes it easy to determine the position of the fiducial 202 in the contact lens. In other embodiments, optical conditioning element 104 consists of two layers of optical elements separated by a distance such that received light 301 passes first through one optical element layer then propagates through the separation distance before passing through the second optical element layer before being incident on the photodetector 105. The use of two layers can provide increased accuracy and ease of determining the position of the fiducial 202 on or within the contact lens. This will be discussed in more detail in conjunction with FIGS. 13 and 14. Each of the two layers may be a shadow mask, holographic element, diffractive element, reflective element, or refractive element. Similarly, the optical conditioning element 104 may consist of three or more layers of optical elements.

The photodetector element or array 105 generates an output signal or signals in response to the pattern of received light 301 incident upon it after passing through optical conditioning element 104. In one embodiment, the photodetector 105 is a position sensing detector (PSD). When there is incident light on the active area of the PSD, photocurrents are generated and collected from four electrodes placed along each side of the square photodetector near the boundary. The incident light position can be determined from the currents collected from the electrodes. In other embodiments, the photodetector element 105 may consist of an array of discrete photodetecting regions, each of which produces an output signal proportional to the integrated intensity of the light incident on that region. In one embodiment, this array consists of 4 equal-sized square detecting regions arranged as a two by two array, typically referred to as a quadrant detector. The position of light beam on this detector in x and y (or also the position of the absence of a light beam, i.e., shadow surrounded by light) is obtained by taking the difference in output between the sum of the two left side detectors and the sum of the two right side detectors for the x-direction and by the difference in the sum of the two upper detectors and the sum of the two lower detectors for the y-direction. Other embodiments use a photodetector array 105 that has more than four discrete photodetecting regions, perhaps a large number of photodetecting regions such as the sensor in a digital camera. With a greater number of elements in the photodetector array, better gaze tracking accuracy can be achieved at the cost of higher processing power.

The electronics 106 in the transceiver subsystem 100 may be incorporated into the transceiver module or they may be remote. The purpose of the electronics is to provide a drive signal to the optional light emitter 101 and to process the output signals from the photodetector element 105 in order to extract the instantaneous position of the fiducial 202 on the contact lens. The light emitter drive signal in one embodiment is a DC signal, simply turning on the light emitter at a constant output level. In another embodiment, the drive signal modulates the light emitter with a specified waveform. This drive waveform facilitates separating the light from light emitter 101 from other light that may be present in the environment and which would cause noise and reduced accuracy in the gaze tracking system.

Turning now to the contact lens subsystem 200, the contact lens subsystem 200 includes at least one marker or fiducial 202 placed in the contact lens. In addition, the contact lens subsystem 200 may or may not include the optical prescription 201 of the wearer, some electronics if needed to drive a light emitting fiducial 202, and auxiliary optics if needed to condition the light emitted or reflected from the fiducial 202. For example, if two reflecting fiducials are included in a single contact lens, then an auxiliary optical element such as a wave retarder may be placed in front of one of the reflecting fiducials in order to distinguish between the two reflecting light paths. If the wave retarder is a quarter-wave retarder with the proper orientation of its ordinary and extraordinary axes, then polarized light passing through the wave retarder twice, once on its path towards the reflecting fiducial and once after it has been reflected, will have its polarization in an orthogonal state compared to light which did not pass twice through the quarter wave retarder. In this way, the light reflected from each of the two reflecting fiducials will have an orthogonal polarization state which can be used to distinguish tem at the detector module.

In some embodiments, the fiducial 202 is a retroreflector. Many types of retroreflectors are available including corner cube, microbead, and micro-corner-cube array. Retroreflectors are commonly used in traffic signs to reflect light from the sign back towards the driver's headlights. By design, the retroreflection is not perfect (which would send all the light back to the headlights and none to the driver) but rather reflect in the general direction of the incident beam with some spread. In the context of this disclosure, that means that it is not necessary to place the detector system directly in line with the emitter. Some embodiments have the emitter element nearby the detector but not directly centered on the detector, while other embodiments do place the detector directly in line with the emitter with the optional use of a beamsplitter to create a path to the photodetector that is optically "in line" with the emitter, but the reflected light does not intersect the emitter on its path to the detector (e.g. see FIG. 9). Still other embodiments have the detector directly in line with the emitter and the reflected light does intersect the emitter on its path to the detector (e.g. see FIG. 5 and FIG. 6). The reflecting fiducial is comprised of a material which will reflect at least one wavelength of light emitted by light emitter 101.

In another embodiment, the fiducial 202 is a diffuse or scattering reflector. The diffuse or scattering reflector reflects incident light into a broad range of reflected directions, some part of which will be incident on the optical conditioning element 104 of the transceiver subsystem 100. The reflecting fiducial is comprised of a material which will reflect at least one wavelength of light emitted by light emitter 101.

In another embodiment, the fiducial 202 is a photoluminescent element that emits light when it is illuminated by light of a suitable wavelength. It is necessary in this embodiment that the light from light emitter 101 is of the proper wavelength range to excite the photoluminescent fiducial. An auxiliary optical element may be included in the contact lens in this embodiment to collect the light emitted from the photoluminescent fiducial and send it in the direction of the transceiver 100.

In another embodiment, the fiducial 202 is an electrically driven light emitter. In this case, some electronic means of driving the light emitting fiducial must be included in the contact lens subsystem 200. The driving electronics can be embedded in the contact lens and powered by an embedded photovoltaic element or by an embedded battery or by some wireless means of delivering power (e.g., inductive coupling) to the electronics in the contact. An auxiliary optical element may be included in the contact lens in this embodiment to collect the light emitted from the light emitting fiducial and send it in the direction of the transceiver 100.

The fiducial is comprised of a material compatible with contact lens construction and located on a surface of the contact lens or within the body of the contact lens. Titanium dioxide is one such material that reflects NIR and has market clearance as a colorant for contact lenses. The fiducial is sized 0.25 mm to 4.0 mm diameter or could be shaped as a rectangle or other shape of similar size. The contact lens is rotationally stabilized by one or more methods known in the art. The lens may be stabilized by the use of a prism shape, a prism shape in only the peripheral aspect of the lens while without prism in the optical portion, by a single superior slab off, by a double slab off, by symmetrical zones of greater or lesser thickness, by asymmetrical zones of greater or lesser thickness or by the addition of a material of having greater density than the body of the contact lens.

The fiducial(s) 202 is(are) located on or within the lens in a position relative to the rotationally stabilized features so that it will remain uncovered by the upper and lower lids when the eye is in a normal open eye state. In some embodiments, the fiducial 202 is located in a position intended to be temporal to the visual axis. In alternate embodiments, the fiducial 202 is located nasal to the visual axis, inferior to the visual axis, superior to the visual axis or in a combination of lateral and vertical positions relative to the visual axis of the wearer when the lens is positioned on at least one eye of a wearer. When there are multiple fiducials, their positions will be a combination of the positions just described.

Referring again to FIG. 1, let us now look at how the gaze tracking system works. The gaze tracking begins by the subject donning the contact lenses 200 that contain the fiducial(s) 202. As the subject's eyes move, the contact lens 200 and fiducial 202 move along with the eyes. Light from the fiducial 301, whether it originates from an emitter in the transceiver 101 and is reflected from the fiducial 202, or it originates from a light emitting fiducial 202, is transmitted to the transceiver 100 and intercepts the optical conditioning element 104. As the fiducial 202 moves with eye motion, the incidence angle of light 301 onto optical conditioning element 104 changes and the intensity pattern of light on the photodetector 105 changes in response to the change in angle. This change of the intensity pattern on photodetector 105 in response to the change of angle may be a simple change of position of a dark or bright spot if the optical conditioning element is a shadow mask or lens, or it may be a change in the shape and profile of the intensity pattern if the optical conditioning element 104 is a two-layer structure. The output(s) of the photodetector 105 is processed by the electronics 106 to calculate the instantaneous position of the fiducial 202 and the gaze direction based on calibration data.

The change in the intensity pattern on the photodetector and the photodetector outputs with change in incidence angle is known by design or measurement. Calibration is used to associate gaze directions with particular patterns. The calibration procedure involves the subject looking successively at a series of known locations that cover the range of eye motion and associating these known gaze directions with the particular photodetector outputs that correspond to these gaze directions. In one embodiment, the system is calibrated for each user by having a calibration routine in the digital display of the eyewear that correlates precise photodetector outputs to known display positions. This is accomplished by placing target images on the digital display and having the user look directly at the targets for a defined amount of time to collect sufficient data to compute a statistically significant eye gaze position. This method can be used to compensate for saccades in eye-motion. In another embodiment with a digital display, the user would be asked to follow a slowly moving digital target on the screen which would be recorded a series of photodetector outputs and the two sets of data are correlated to generate eye gaze calibration data.

Figure 2A:
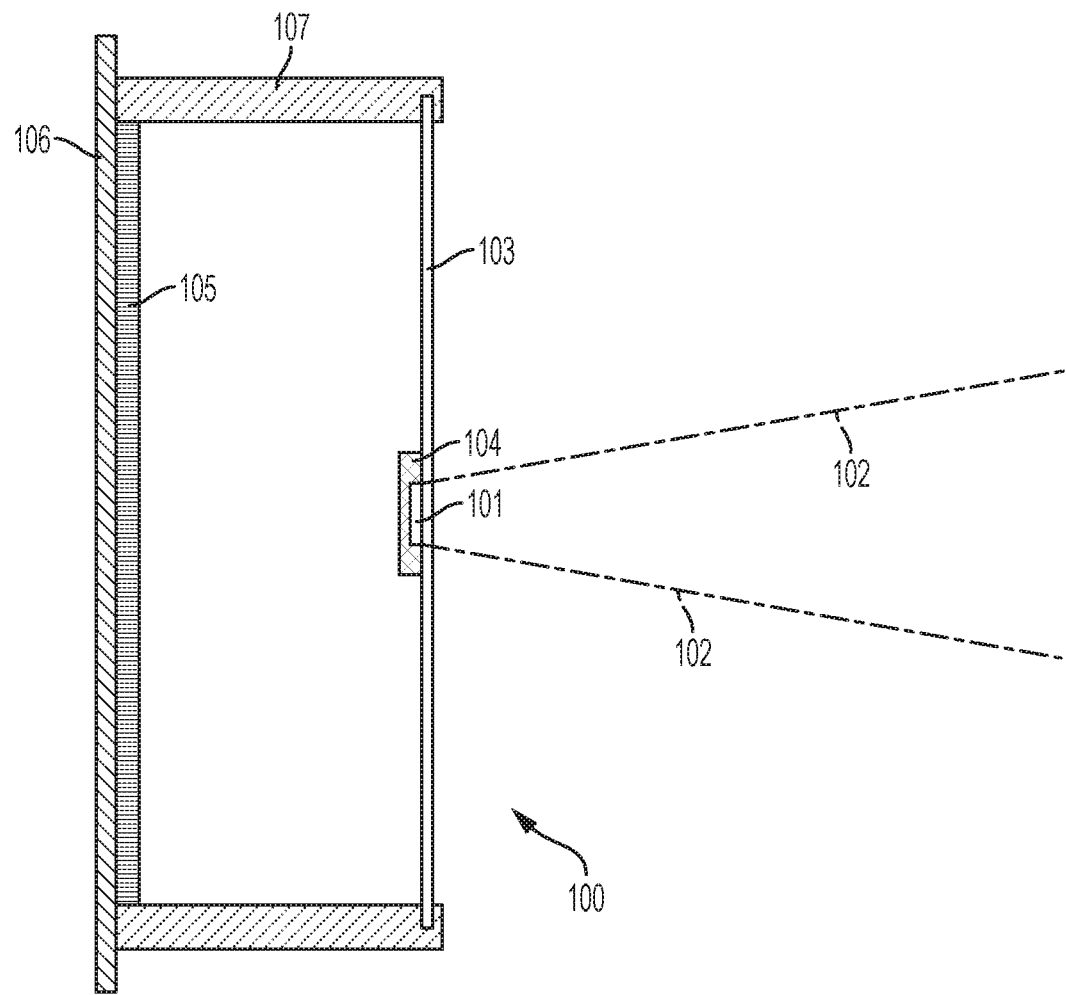
FIG. 2a shows an illustration of a transceiver in accordance with some embodiments of the present disclosure.

FIG. 2a shows an illustration of a transceiver 100 in accordance with some embodiments of the present disclosure. Light emitter 101 is attached to an opaque submount 104 which also serves as a shadow mask for reflected light received from the contact lens fiducial. The emitter 101 and shadow mask 104 are attached to a transparent carrier 103 that suspends them above photodetector array 105. PCB (printed circuit board) 106 contains the transceiver electronics. In some embodiments, the complete subsystem is included in a housing 107.

Figure 2B:
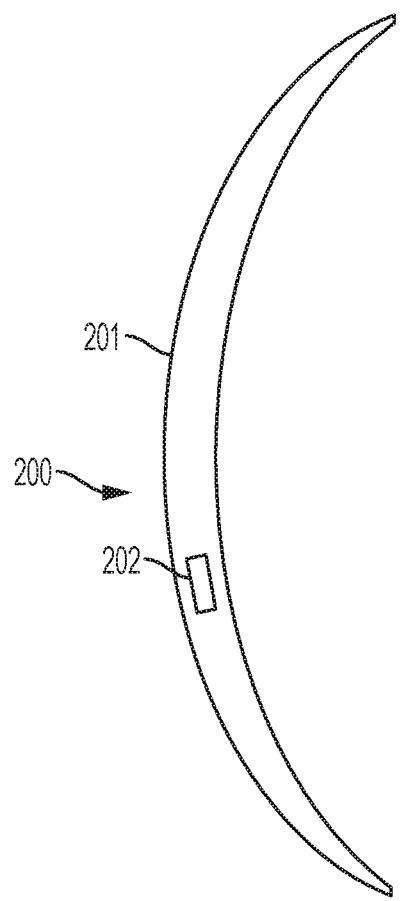
FIG. 2b shows an illustration of a contact lens assembly including a retro-reflector fiducial in accordance with some embodiments of the present disclosure.

FIG. 2b shows an illustration of a contact lens assembly including a retro-reflector fiducial in accordance with some embodiments of the present disclosure. In these embodiments, the fiducial 202 is a retroreflector.

Figure 3:
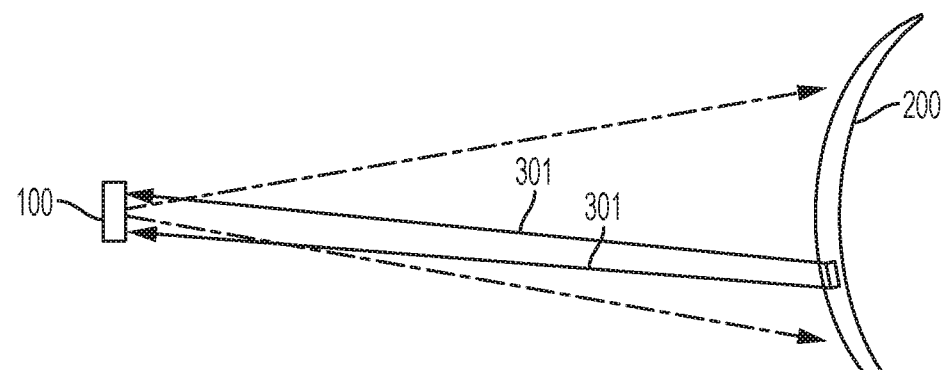
FIG. 3 shows an illustration of a transceiver and contact lens including a fiducial in gaze position one in accordance with some embodiments of the present disclosure.
Figure 4:
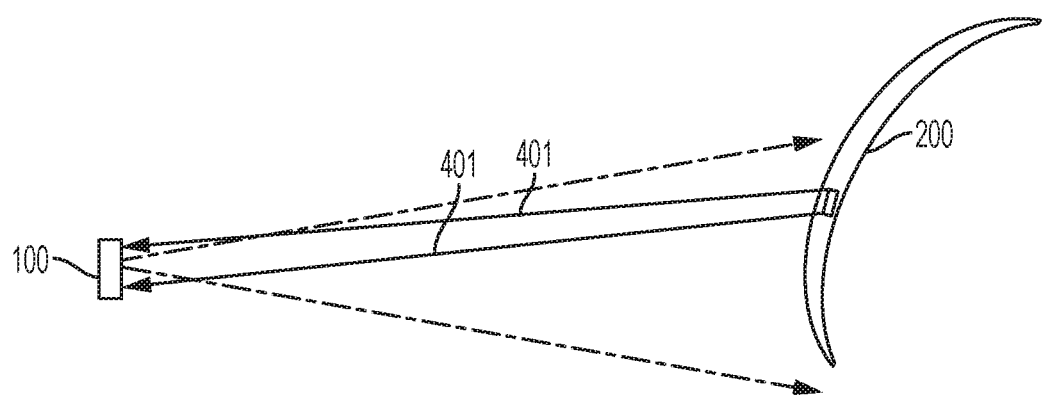
FIG. 4 shows an illustration of a transceiver and contact lens including a fiducial for gaze position two in accordance with some embodiments of the present disclosure.

FIG. 3 shows an illustration of a transceiver and contact lens including a fiducial in gaze position one in accordance with some embodiments of the present disclosure. FIG. 4 shows an illustration of a transceiver and contact lens including a fiducial for gaze position two in accordance with some embodiments of the present disclosure. In particular, FIG. 3 and FIG. 4 show two gaze positions for an embodiment of the gaze tracking system using the subsystem embodiments shown in FIG. 2. Light is emitted from transceiver 100 and illuminates the contact lens 200. Light 301 and 401 is reflected by the retroreflector fiducial 202 and incident onto transceiver 100. The angle of the light incident of the transceiver changes with the gaze direction, with reflected beam 301 corresponding to gaze position one and reflected beam 401 corresponding to gaze position two.

Figure 6:
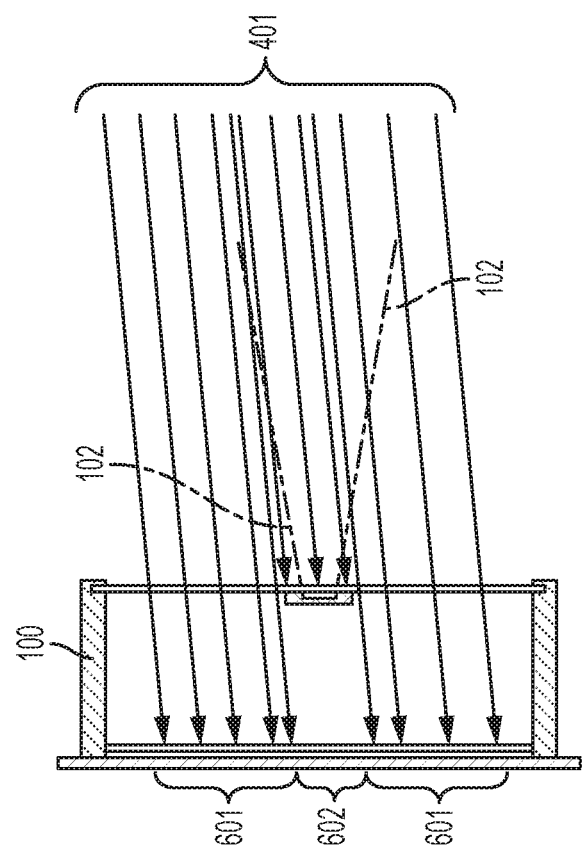
FIG. 6 shows an illustration of light hitting a detector for gaze position two in accordance with some embodiments of the present disclosure.
Figure 5:
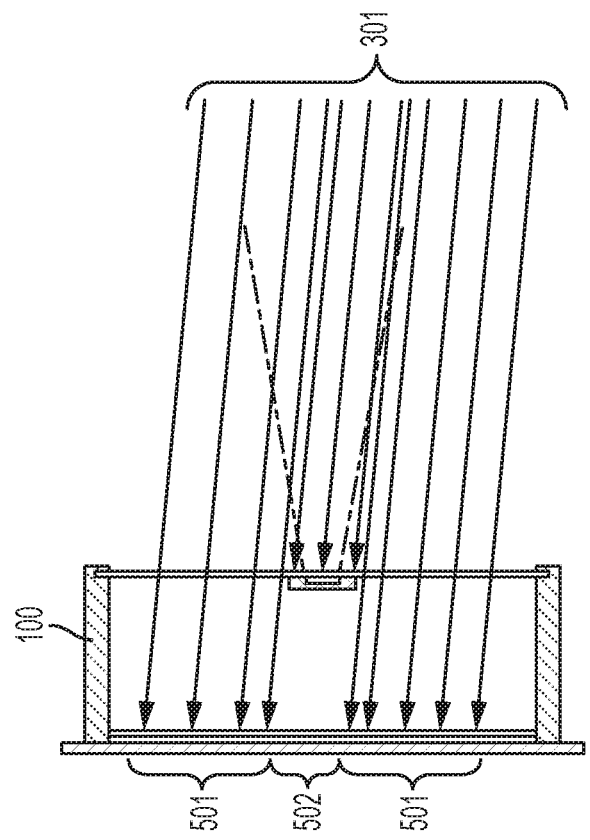
FIG. 5 shows an illustration of light hitting a detector for gaze position one in accordance with some embodiments of the present disclosure.

FIG. 5 shows an illustration of light hitting a detector for gaze position one in accordance with some embodiments of the present disclosure. FIG. 6 shows an illustration of light hitting a detector for gaze position two in accordance with some embodiments of the present disclosure. In particular, FIG. 5 and FIG. 6 show a close-up view of reflected beams 301 and 401 interacting with the transceiver embodiment from FIG. 2a. It is seen that the opaque shadow mask blocks the beam creating shadow 502 and 602 on the photodetector, while the transparent carrier passes the beam creating light regions 501 and 601 on the photodetector. Light region 501 and shadow 502 correspond to gaze position one while light region 601 and shadow 602 correspond to gaze position two.

Figure 8:
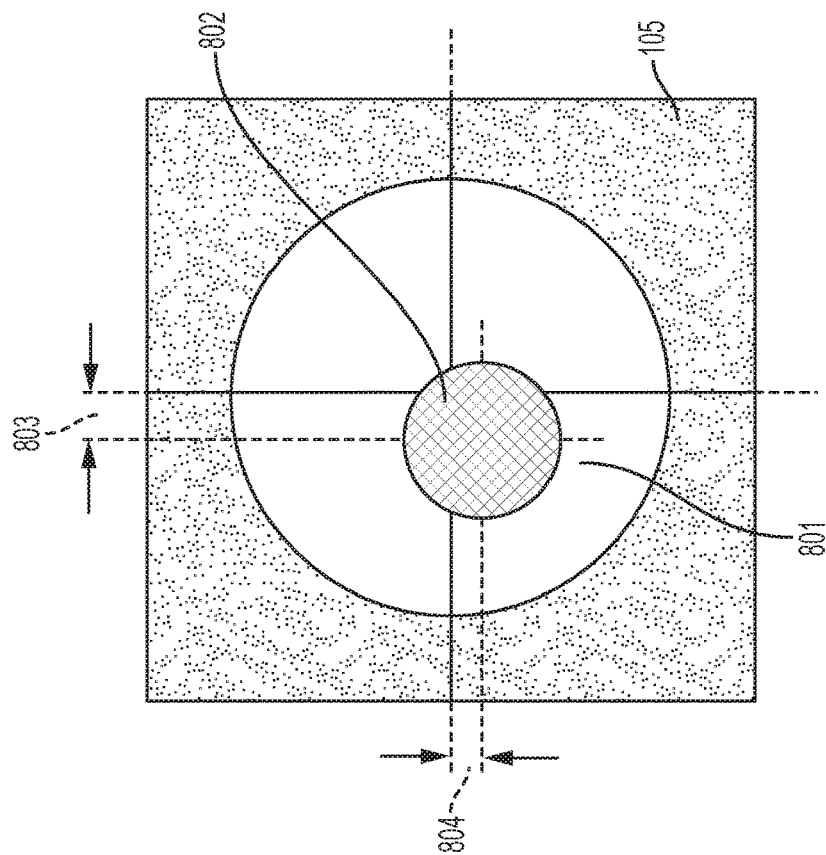
FIG. 8 shows an illustration of a detector image for gaze position two in accordance with some embodiments of the present disclosure.
Figure 7:
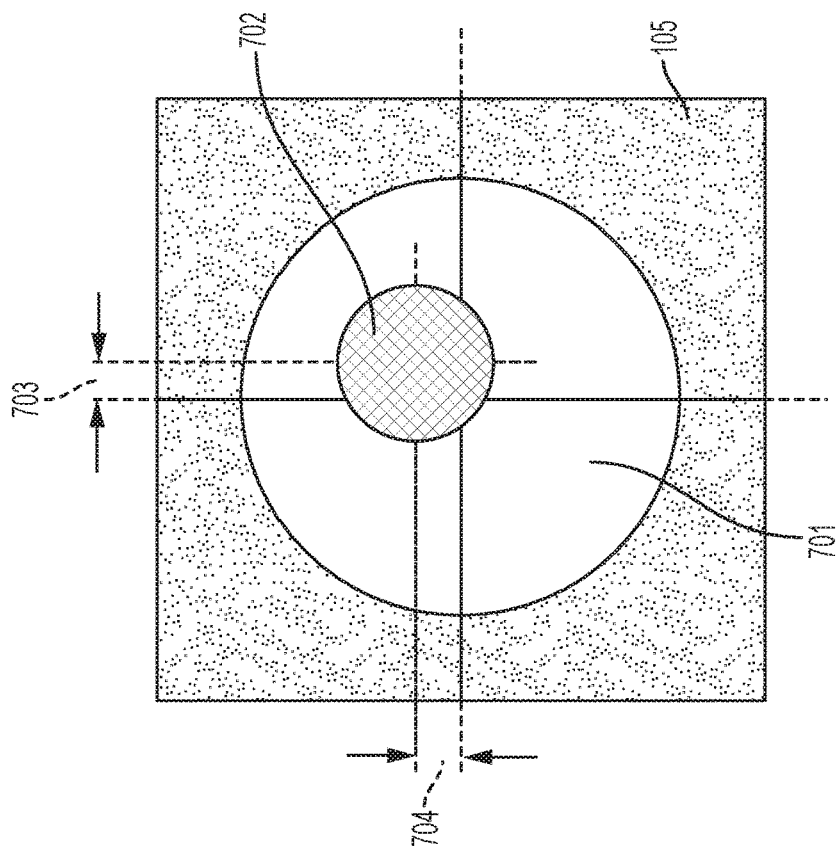
FIG. 7 shows an illustration of a detector image for gaze position one in accordance with some embodiments of the present disclosure.

FIG. 7 shows an illustration of a detector image for gaze position one in accordance with some embodiments of the present disclosure. FIG. 8 shows an illustration of a detector image for gaze position two in accordance with some embodiments of the present disclosure. In particular, FIG. 7 and FIG. 8 show views of the beams from FIGS. 5 and FIG. 6 on the photodetector 105. In this embodiment, the photodetector, known as a quad detector, has four discrete detector elements arranged in a two by two square array. In FIG. 7, incident light pattern 701 and incident shadow 702 correspond to gaze position one. In FIG. 8, incident light pattern 801 and incident shadow 802 correspond to gaze position two. The size of the shadow mask, the spacing between the shadow mask and the photodetector, and the size of the quad detector have been chosen such that, over the range of possible gaze positions, a part of the shadow will always fall in each of the four quadrants. The gaze direction corresponding to the location of the shadow can then be calculated as $x_{gaze}=(UR+LR-UL-LL)*k_1$ and $y_{gaze}=(UL+UR-LL-LR)*k_2$ where UL, UR, LL, and LR stand for the photocurrents measured from the upper left (UL), upper right (UR), lower left (LL), and lower right (LR) quadrants of the quad photodetector and $k_1$ and $k_2$ are a fixed multiplier determined by calibration.

Figure 9:
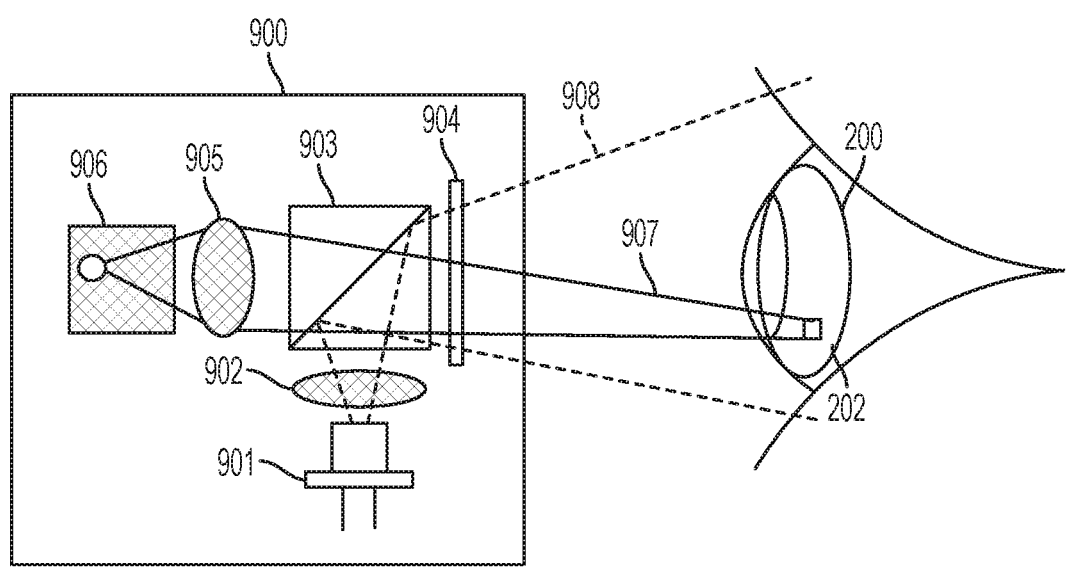
FIG. 9 shows an illustration of a first system layout in accordance with some embodiments of the present disclosure.

FIG. 9 shows an illustration of a first system layout in accordance with some embodiments of the present disclosure. In this embodiment, the contact lens subsystem again uses a retroreflective fiducial 202. The transceiver in this embodiment 900 uses a beamsplitter 903 to position the effective center of the emitter directly in line with the center of the photodetector, thereby achieving the best alignment for receiving the retro-reflected beam. In this embodiment, light source 901 is a laser diode or LED or VCSEL. The light emitted from the light source 901 is collected by lens 902 to reduce its beam divergence if necessary in order to efficiently illuminate the eye, then is reflected towards the eye by beamsplitter 903, which may be polarizing or non-polarizing. In the case of a polarizing beamsplitter 903, it may be useful to include the optional quarter-wave retarder 904 in the beam path. The quarter-wave retarder acts to rotate the polarization of the reflected beam 907 such that it passes through the polarizing beamsplitter to the photodetector 906 with negligible loss in power. If beamsplitter 903 is not a polarizing beamsplitter or if quarter-wave retarder 904 is not used, then the power loss to the received beam 907 passing through the beamsplitter 903 on its way to the photodetector 906 will be 50% or greater. In this embodiment, a lens 905 is used as the optical conditioning element. Lens 905 focuses the received beam 907 to a small spot on photodetector 906. In this embodiment, photodetector 906 is a position sensing detector (PSD). The centroid location of the spot on the PSD 906 is determined directly from the ratio of the photocurrents collected by the electrodes running along each side of the PSD.

Figure 10:
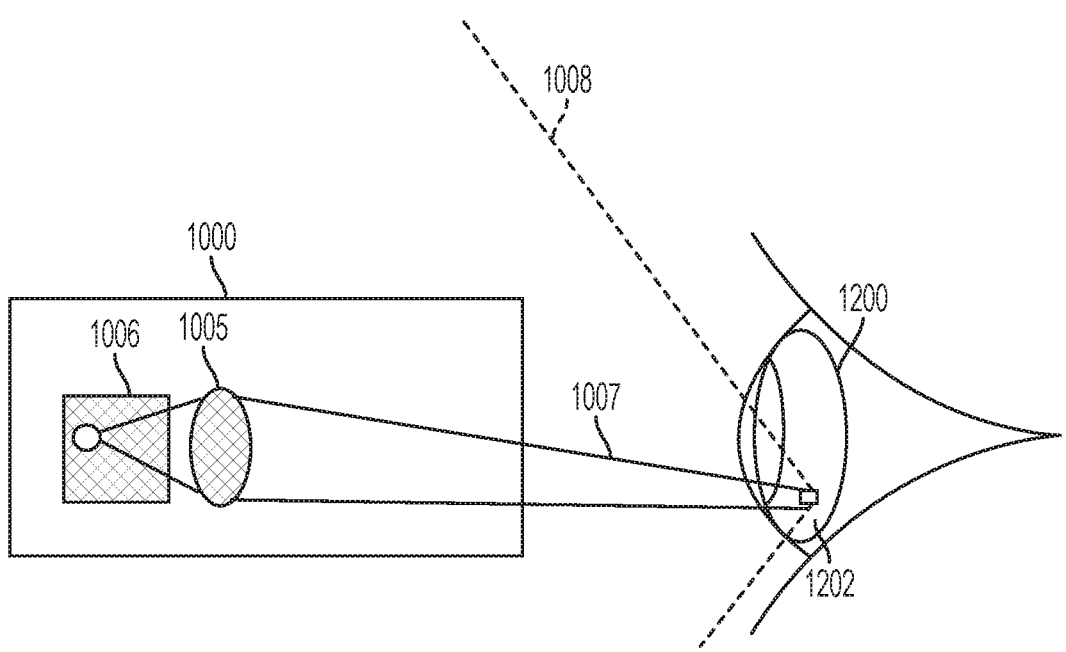
FIG. 10 shows an illustration of a second system layout in accordance with some embodiments of the present disclosure.

FIG. 10 shows an illustration of a second system layout in accordance with some embodiments of the present disclosure. This embodiment uses a light emitting fiducial 1202 in the contact lens 1200. The transceiver in this embodiment does not contain a light source. A portion 1007 of the light beam 1008 emitted by light emitting fiducial 1202 is incident on transceiver 1000. Received light beam 1007 is incident on the optical conditioning element 1005, a simple lens in this embodiment. As in the previous embodiment, the lens 1005 focuses the received light to a small spot on PSD photodetector 1006. It is not necessary that PSD 1006 be precisely in the focal plane of lens 1005, just that the spot on the PSD is small compared to the size of the PSD. The centroid location of the spot on the PSD 906 is determined directly from the ratio of the photocurrents collected by the electrodes running along each side of the PSD.

Figure 11:
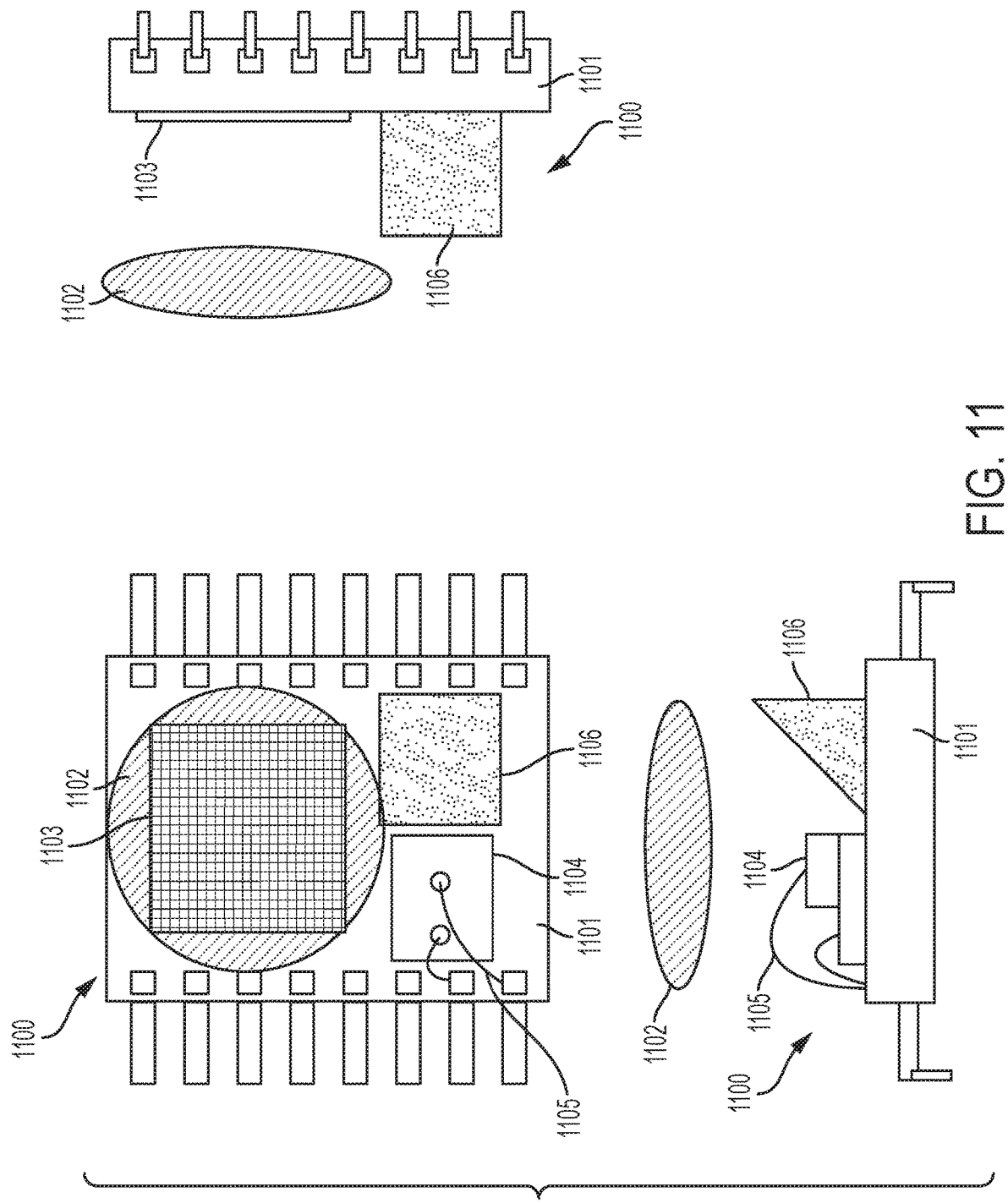
FIG. 11 shows an illustration of three views of a first packaging layout of the eye-tracking transceiver module in accordance with some embodiments of the present disclosure.

FIG. 11 shows an illustration of three views of a first packaging layout of the eye-tracking transceiver module 1100 in accordance with some embodiments of the present disclosure. This embodiment of the transceiver uses a laser diode 1104 as the light emitter. The transceiver subsystem is built upon a lead-frame format layout frequently used in manufacturing high volume optoelectronic systems such as optical pickup heads for optical disk drives. Alternative package formats could also be used in place of the lead-frame, such as ball-grid array, TO can, or any other modern package format suitable to support the integration of small opto-electronic systems. The laser diode 1104 sits on a submount with electrical contact to the bottom side of the laser diode. Wires 1105 to carry power and drive signal to the laser are bonded to the two sides of the laser and to bonding pads on the package. A microprism 1106 or other reflective surface at 45 degrees orientation is used to turn the laser beam so that it exits perpendicular to the package. The optical conditioning element in this embodiment is a lens 1102, mounted on a cap or cover (not shown) to the lead frame package. In this embodiment, the photodetector 1103 is a 2D array of photodetector elements with at least four pixels and perhaps as many as the sensor in a camera. Electrical connections are also made to the photodetector array using wirebonds or other structures suitable for the packaging format. In this embodiment, the laser beam is not centered on the photodetector array. This design is suitable for use in conjunction with a retroreflecting fiducial where there is some spread in the retroreflected beam such that the photodetector is sufficiently illuminated by the received beam. It could also be used in conjunction with a diffuse reflecting fiducial.

Figure 12:
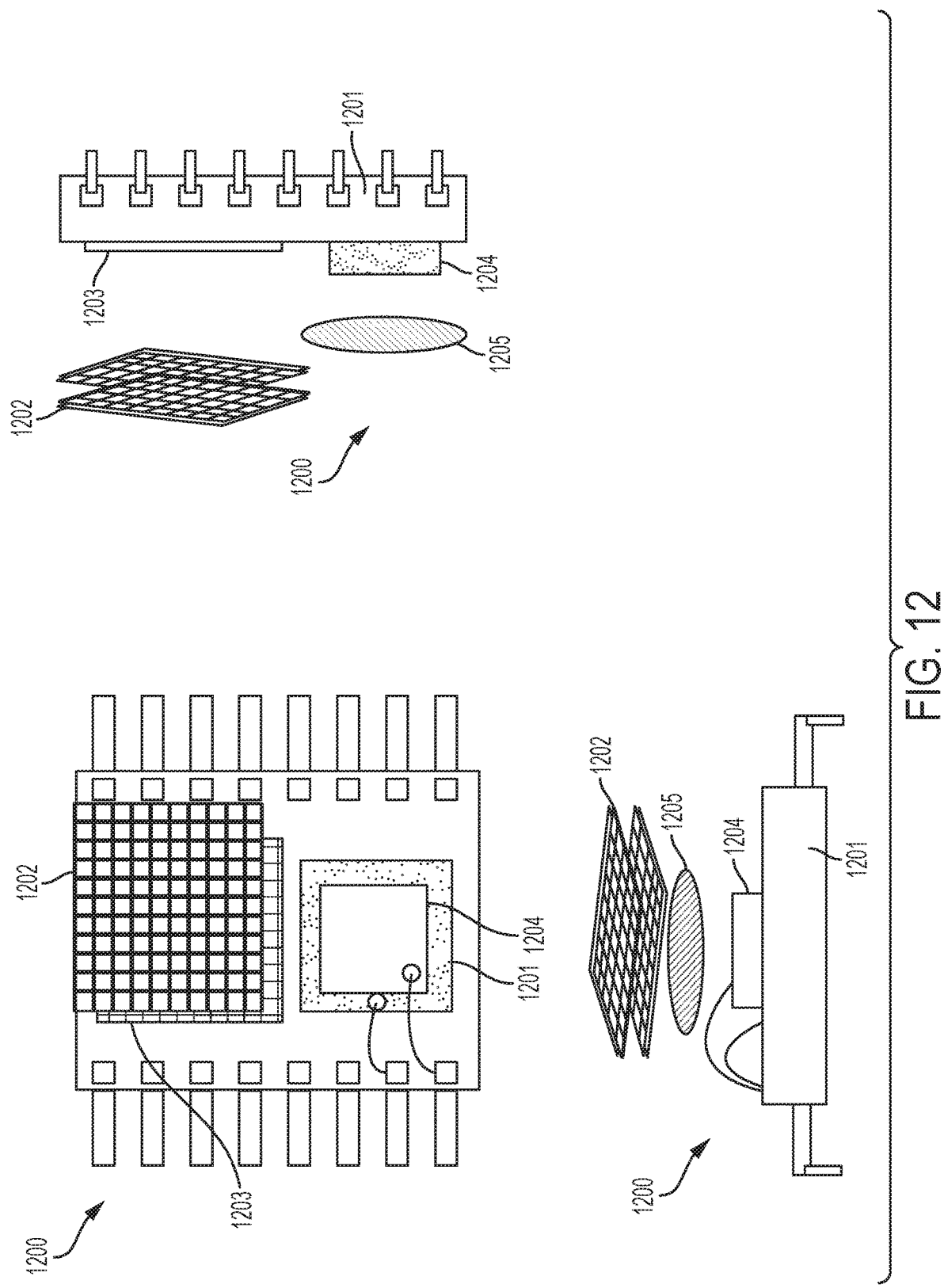
FIG. 12 shows an illustration of three views of a second packaging layout of the eye-tracking transceiver module in accordance with some embodiments of the present disclosure.

FIG. 12 shows an illustration of three views of a second packaging layout of the eye-tracking transceiver module 1200 in accordance with some embodiments of the present disclosure. Again, a lead-frame format is shown for the package format as an example; other packaging formats suitable for mass production of micro opto-electronic systems could also be used in place of a lead-frame package. In this embodiment, the light source 1204 is a VCSEL or LED. These light sources naturally emit a beam perpendicular to the plane of the device so that a turning mirror as used in the previous embodiment is not necessary. The optical conditioning element 1202 and the optional light source conditioning optics 1205 are mounted above the light source 1204 and photodetector 1203 using a cap or cover (not shown) to the package 1201. In this embodiment, the photodetector 1203 is a 2D array of photodetector elements similar to the sensor in a cell phone camera. The optical conditioning element 1202 in this embodiment is a two-layer structure designed to provide higher accuracy in determining small changes in the position of the contact lens fiducial.

Figure 13:
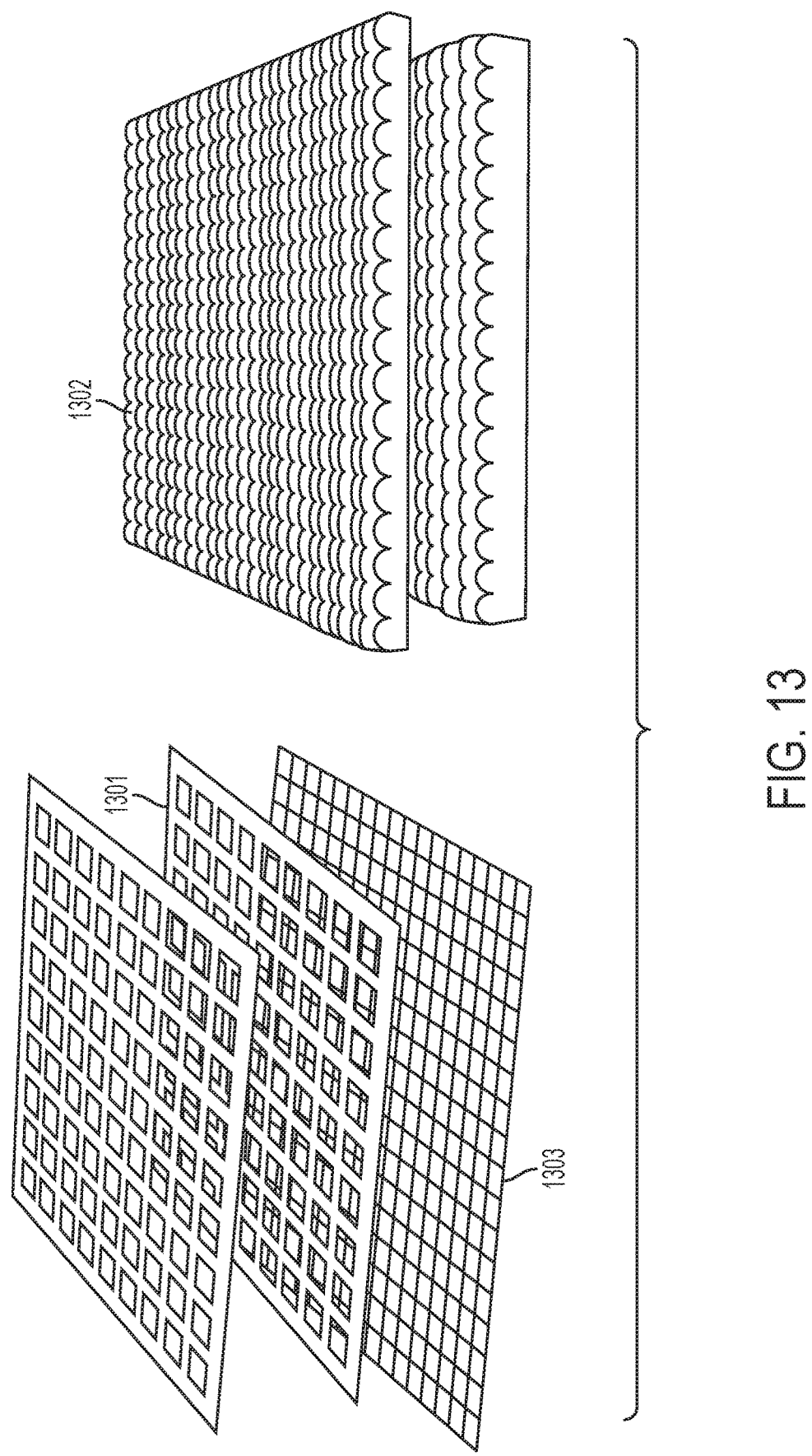
FIG. 13 shows an illustration of two examples of two-layer optical conditioning elements in accordance with some embodiments of the present disclosure.

FIG. 13 shows an illustration of two examples of two-layer optical conditioning elements in accordance with some embodiments of the present disclosure. The example on the left shows the use of two ruled shadow masks 1301. The example on the right shows two microlens arrays 1302. Both examples would be used in conjunction with a photodetector array 1303 as shown on the left. To understand the operation principle, consider FIG. 14.

Figure 14:
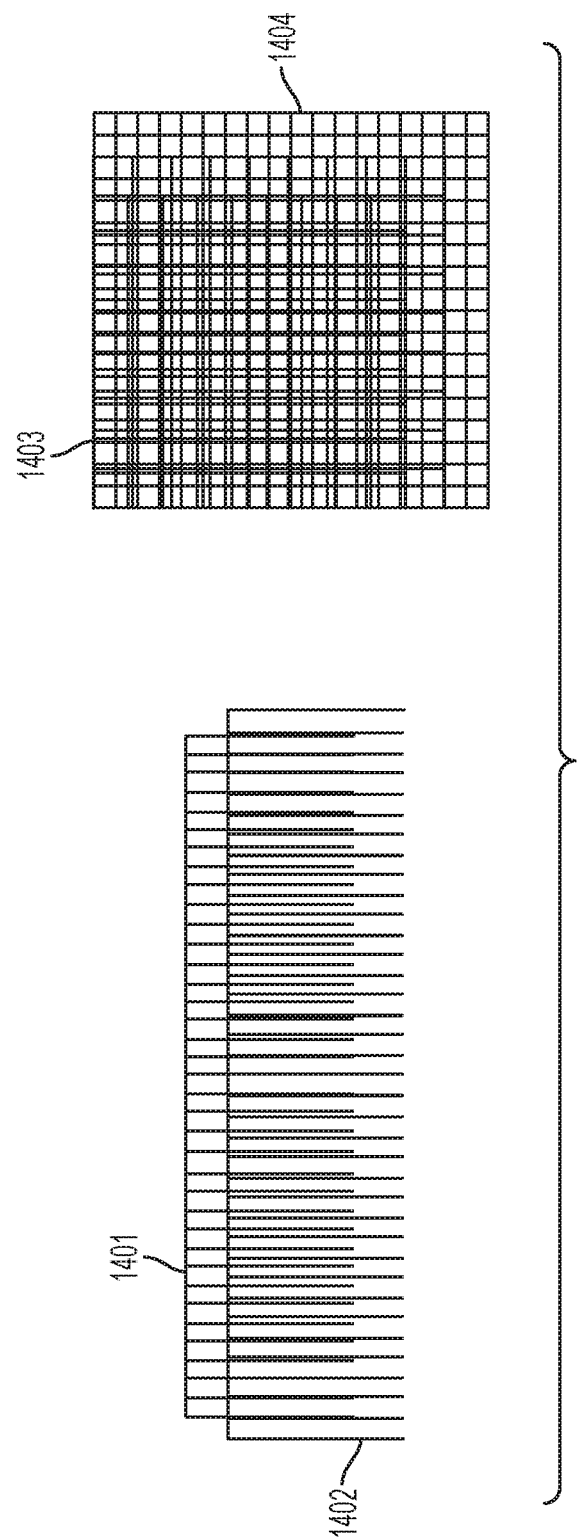
FIG. 14 shows an illustration of line ruled shadow masks in accordance with some embodiments of the present disclosure.

FIG. 14 shows an illustration of linear ruled shadow masks in accordance with some embodiments of the present disclosure. The left hand side show a pair of 1D ruled shadow masks, 1401 and 1402, superimposed in a two-layer structure. In this case, ruled shadow mask 1401 has a slightly smaller pitch between the ruled lines than ruled shadow mask 1402. As light traverses the two layers, the pattern incident on the photodetector array will look similar to the area where 1401 and 1402 overlap. Due to the small difference in pitch, dark and light areas are created. This is a type of Moiré pattern. The dark and light areas represent the beat pattern of the two different grating pitches. If a small shift is introduced between the two layers, the dark and light areas move and shift left or right very rapidly. A shift between the two patterns of just one grating pitch, will cause a shift of the dark and light areas by a full cycle of the beat frequency. This is also related to the principle used in Vernier scales. The right hand side shows the analogous case for two 2D ruled shadow masks, 1403 and 1404, superimposed in a two-layer structure. Considering the two shadow masks as two layers of an optical conditioning element, a change in the angle of the light (resulting from a change in the position of the contact lens fiducial) is equivalent to a slight shift in the relative positions of the two layers. This produces a large shift in the beat frequency pattern that is incident on the photodetector array. In this manner, a two-layer optical conditioning element can induce large changes in the detected intensity pattern resulting from small changes in the position of the contact lens fiducial. It is not necessary that the two layers be shadow masks, which have the disadvantage of blocking some of the received light and thereby reducing the signal-to-noise ratio. Other periodic or non-periodic elements can be used in the two layers such as the pair of microlens arrays 1302 shown in FIG. 13. Similarly, diffractive, holographic, or refractive elements could be used in the layers of a two-layer optical conditioning element.

Figure 15:
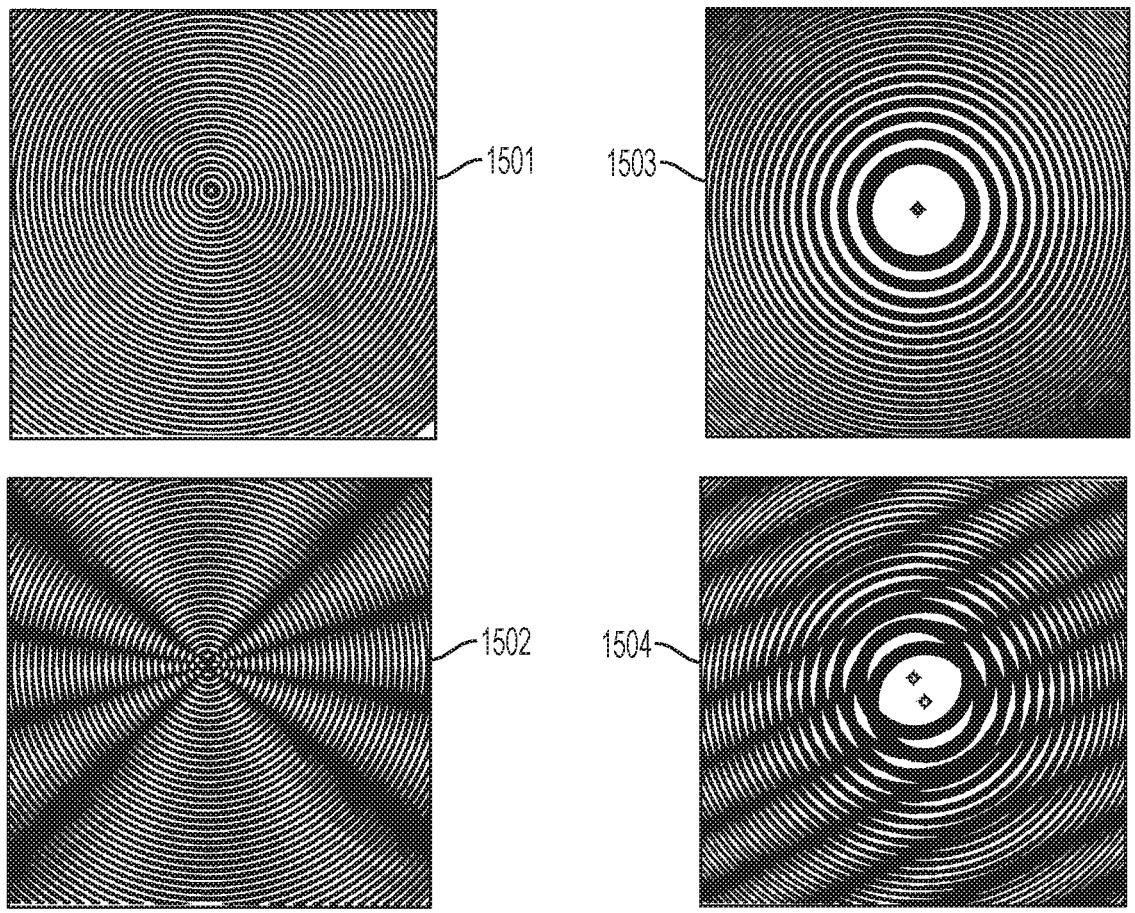
FIG. 15 shows an illustration of alternate embodiments for two-layer optical conditioning elements in accordance with some embodiments of the present disclosure.

FIG. 15 shows an illustration of alternate embodiments for two-layer optical conditioning elements in accordance with some embodiments of the present disclosure. The top images, 1501 and 1503, show the pattern for a single layer. The images just below show the result of a two-layer structure using the pattern directly above them for both layers. The two-layer images, 1502 and 1504, represent a slight shift between the two layers as would occur when an optical beam traverses the layers at an angle. 1502 results from a two-layer structure composed of uniformly spaced concentric circles. The radial "spokes" in pattern 1502 change their position and increase in number rapidly as the angle of the beam traversing the two layers increases. The number of spokes is a measure of the effective shift, while the large gap between the spokes at the top and bottom of 1502 indicates the direction of the effective shift that is the direction of the beam traversing the two layers. The pattern in 1504 results from a two layer structure composed of Fresnel zone plate rings. In this case a slight change in angle causes the bar patterns to change position rapidly and to increase in number.

In summary, the disclosure describes a marker(s) or fiducial(s) in a contact lens worn by the subject whose eye motion is being tracked. The contact lens and fiducial move with the wearer's eye and the eye gaze direction can be determined by knowing the position of the fiducial and the fixed positional offset between the fiducial and the wearer's eye pupil. In one embodiment, this fiducial is a retroreflector. In another embodiment, this fiducial is a light emitter. The invention also uses one or more receivers, separate from the contact lens, which receives light from the fiducial on or in the contact lens and determines the position of the fiducial. In one embodiment, the receiver is part of a transceiver module that also contains a light source. This light source illuminates the eye and the light that hits a retroreflector is reflected back towards the transceiver module. The reflected light is received by the receiver containing an optical element and a photodetector system. The optical element acts on the reflected light to create a light distribution on the photodetector system from which the instantaneous position of the retroreflecting fiducial in the contact lens can be determined. In another embodiment, the fiducial on or in the contact lens itself emits light. In this embodiment, the light from the fiducial is received by the receiver containing an optical element and a photodetector system. The optical element acts on the received light to create a light distribution on the respective photodetector system from which the instantaneous position of the fiducial in the contact lens can be determined.

Reference throughout this specification to "an embodiment," "some embodiments," or "one embodiment." means that a particular feature, structure, material, or characteristic described in connection with the embodiment is included in at least one embodiment of the present disclosure. Thus, the appearances of the phrases such as "in some embodiments," "in one embodiment," or "in an embodiment," in various places throughout this specification are not necessarily referring to the same embodiment of the present disclosure.

Furthermore, the particular features, structures, materials, or characteristics may be combined in any suitable manner in one or more embodiments.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A gaze tracking system comprising:
   a contact lens including a fiducial having a position;
   a photodetector element to receive a light signal from the fiducial and to provide a photodetector output signal, the light signal to provide a light intensity pattern on the photodetector;
   an optical conditioning element to receive the light signal and to provide a variation in the light intensity pattern on the photodetector in response to changes in the position of the fiducial; and
   electronics to process the photodetector output signal to calculate the position of the fiducial.

2. The gaze tracking system of claim 1, wherein the fiducial includes a retroreflector.

3. The gaze tracking system of claim 1, wherein the fiducial includes a light emitter.

4. The gaze tracking system of claim 1, wherein the fiducial includes a photoluminescent element.

5. The gaze tracking system of claim 1, wherein the fiducial includes titanium dioxide.

6. The gaze tracking system of claim 5, wherein the fiducial has a diameter of between 0.25 mm and 4.0 mm.

7. The gaze tracking system of claim 1, wherein the photodetector includes a position sensing detector.

8. The gaze tracking system of claim 1, wherein the photodetector includes a photodetector array.

9. The gaze tracking system of claim 1, further comprising a light source to provide a light source signal to the fiducial.

10. The gaze tracking system of claim 9, wherein the light source includes a light emitting diode.

11. The gaze tracking system of claim 9, wherein the light source is included in a digital display.

12. The gaze tracking system of claim 1, wherein the optical conditioning element includes a shadow mask.

13. The gaze tracking system of claim 1, wherein the optical conditioning element includes a lens.

14. The gaze tracking system of claim 1, wherein the optical conditioning element includes two or more layers.

15. The gaze tracking system of claim 1, wherein the optical conditioning element includes a spectral bandpass filter to reduce ambient interference.

16. The gaze tracking system of claim 1, further comprising a frame, the photodetector element, the optical conditioning element, and the electronics mounted on the frame.

17. The gaze tracking system of claim 16, wherein the frame includes a frame for spectacle eyewear.

18. The gaze tracking system of claim 16, wherein the frame includes a head mounted display.

19. The gaze tracking system of claim 1, further comprising a calibration procedure to associate the photodetector output signal with a known gaze direction.

20. The gaze tracking system of claim 1, further comprising a light emitter to provide an emitter light signal to the fiducial and the electronics to provide a drive signal to the light emitter.

21. A method comprising:
    generating a light signal having a light intensity pattern at a contact lens having a fiducial, the fiducial having a position;
    receiving the light signal at a photodetector element and producing a photodetector output signal;
    generating a variation in the light intensity pattern in response to changes in the position of the fiducial; and
    processing the photodetector output signal to calculate the position of the fiducial.

22. The method of claim 21, wherein generating a light signal having a light intensity pattern at a contact lens having a fiducial includes illuminating the fiducial.

23. The method of claim 21, further comprising processing the position of the fiducial and the photodetector output signal and the variation in the light intensity pattern to calibrate a gaze tracking system.

24. The gaze tracking system of claim 1, wherein the photodetector element, the optical conditioning element, and the electronics form a subsystem mounted on a frame.

25. The gaze tracking system of claim 24, wherein the frame is mounted on a spectacle eyeware frame.

26. The gaze tracking system of claim 24, wherein the frame is mounted on a head mounted display.

* * * * *